UNITED STATES PATENT OFFICE.

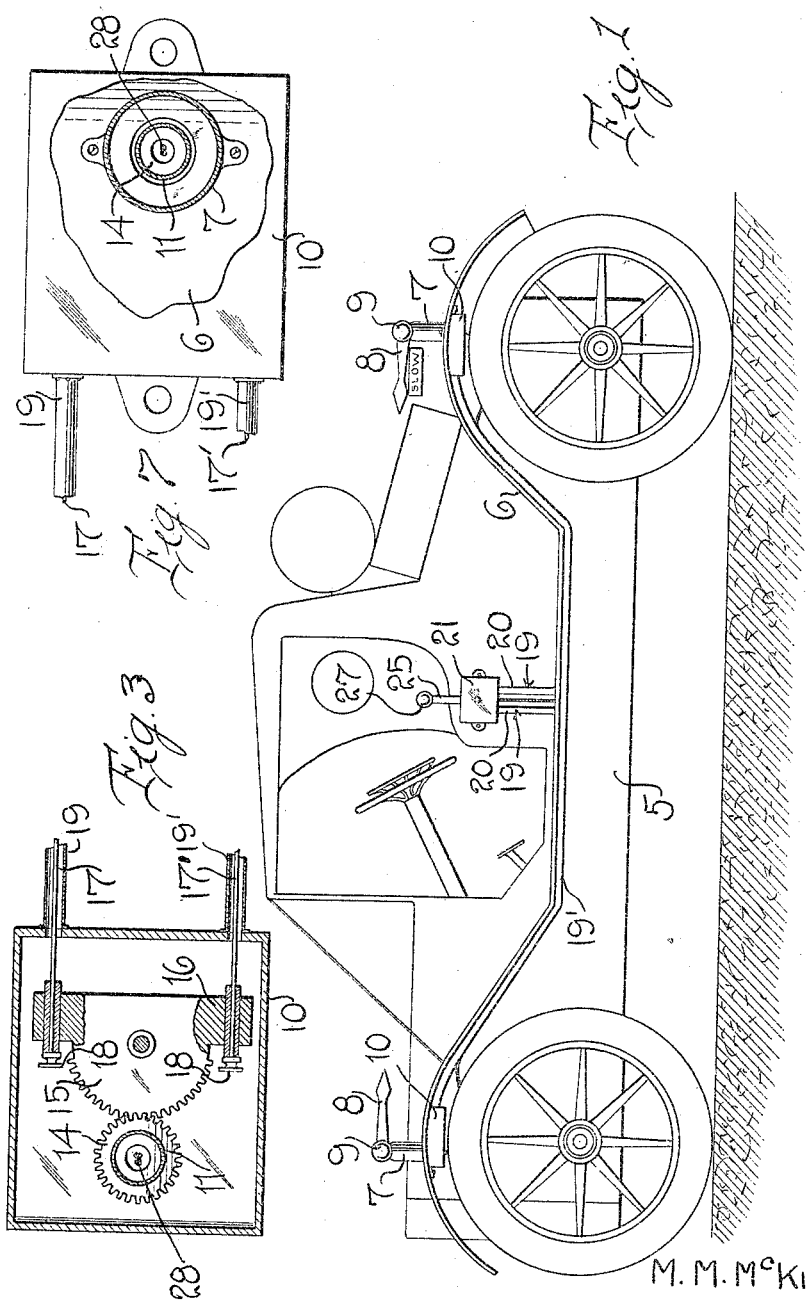

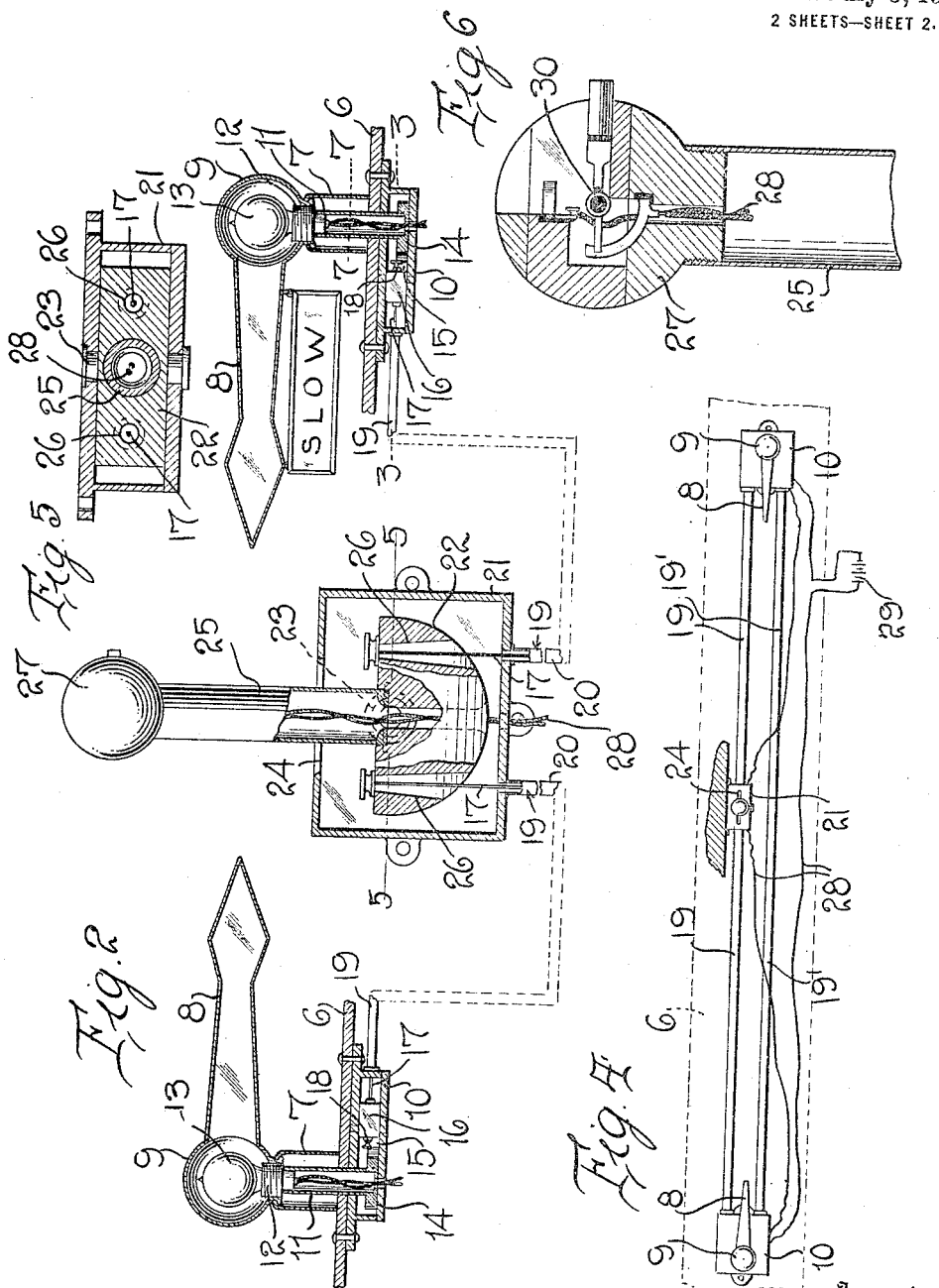

MILO MONROE McKINNEY, OF WAUWATOSA, WISCONSIN.

SIGNALING DEVICE FOR MOTOR-VEHICLES.

1,232,348.  Specification of Letters Patent.  Patented July 3, 1917.

Application filed August 18, 1915. Serial No. 46,140.

*To all whom it may concern:*

Be it known that I, MILO M. MCKINNEY, a citizen of the United States, residing at Wauwatosa, in the county of Milwaukee and State of Wisconsin, have invented certain new and useful Improvements in Signaling Devices for Motor-Vehicles, of which the following is a specification, reference being had to the accompanying drawings.

This invention relates to an improved signaling device or direction indicator for motor vehicles and has for its primary object to provide a device of this character which may be instantly operated from the driver's seat to indicate to motorists and pedestrians the contemplated direction of movement of the vehicle.

More specifically stated, the present invention has for one of its more important objects to provide front and rear indicating arrows mounted upon the body of the vehicle provided with means whereby the arrows may be illuminated, and an operating element mounted adjacent to the driver's seat and operatively connected to said arrows to simultaneously actuate and move the same so that they will point in the desired direction.

The invention has for an additional object to provide rotatably mounted arrows of hollow construction, each having an incandescent electric light bulb in its inner end, an electric circuit, and a suitable switch mounted in the operating lever or handle whereby, when the arrows are turned or rotated, the circuit will be closed.

The invention has for an additional general object to provide a direction indicating device for motor vehicles of the above character which is simple in its construction and may be readily applied to the vehicle by the individual owner, without requiring any alterations in the construction thereof.

With the above and other objects in view, my invention consists in the novel features of construction, combination and arrangement of parts to be hereinafter more fully described, claimed and illustrated in the accompanying drawings, in which, Figure 1 is a side elevation of a motor vehicle having my improved indicating device applied thereto:

Fig. 2 is a vertical section through the several parts of the device;

Fig. 3 is a horizontal section taken on the line 3—3 of Fig. 2;

Fig. 4 is a top plan view;

Fig. 5 is a section taken on the line 5—5 of Fig. 2;

Fig. 6 is a detail vertical section of the operating handle or lever; and

Fig. 7 is a horizontal sectional view taken on the line 7—7 of Fig. 2, the mud guard being broken away.

Referring in detail to the drawings, 5 designates the body of a motor vehicle having the usual mud guard 6 extending over the front and rear vehicle wheels.

Upon the upper side of the mud guard 6, upon one side of the vehicle body and above the front and rear wheels thereof, a hollow metal standard 7 is suitably secured. 8 designates an indicating arrow, preferably constructed of celluloid, which is preferably colored red. This arrow at one end is of bulbous formation, as shown at 9, and is rotatably mounted upon the upper end of the hollow standard 7. Upon the under side of the mud guard, a suitable casing 10 is secured, and a hollow vertical spindle 11 is disposed through an opening in the mud guard and the contiguous wall of said casing. The other end of this spindle is provided with a collar 12 having a threaded connection with the bulb 9 of the indicating arrow. The plug of an electric light bulb 13 has threaded engagement in this collar, said bulb being centrally located in the end of the arrow 8. The lower end of the hollow spindle 11 is provided with a pinion 14 with which a gear segment 15 meshes. This gear segment is carried by a horizontal bar 16, to the opposite ends of which wires or other flexible elements 17, 17' are connected. Suitable tensioning nuts 18 are preferably threaded upon the ends of these wires.

To one end wall of the casing 10, adjacent to each side thereof, one end of a guide tube 19, 19' is attached, and through these tubes the respective wires 17 extend. The tubes 19 are disposed along the under side of the mud guard, and one tube 19, connected to each of the casings 10, is extended upwardly at the center of the foot board, as shown at 20, connected to the bottom wall of the casing 20 fixed upon the side of the vehicle body adjacent to the driver's seat. A single tube 19' connects the casings 10, and a wire 17' is movable through this tube and connected to the corresponding ends of the bars 16.

Within the casing 21, a substantially semicircular head block 22 is fulcrumed, as at 23, for rocking movement. The top wall of the casing 21 is formed with a longitudinally extending slot 24 in which the operating handle or lever 25 is movable. This operating handle is of tubular form and has its lower end connected centrally to the head block 22. To the block 22 at opposite sides of the handle 25, the flexible wires 17 are connected, said wires extending through flared openings 26 formed in said block. The upper end of the handle 25 is equipped with a removable spherical member 27. Circuit wires 28, leading from the battery 29, are connected to each of the electric light bulbs 13 and to a suitable switch 30, mounted in the knob 27 of the operating handle.

From the above description, taken in connection with the accompanying drawings, the construction and manner of operation of my invention will be readily understood. When the operator shifts the handle 25 in one direction, one of the wires 17 will be pulled so as to rotate the gear segment 15 on the bar 16 at one end of the mud guard and turn the arrow 8 from a position longitudinally of the machine, as shown in the drawings, to a position transversely thereof so that the arrow will be rendered clearly visible. The other of the wires 17, connected to the block 22, is, of course, slackened and, in the turning movement of the bar 16, the wire 17' is pulled, and as this wire is connected to the other of the bars 16, it is apparent that the gear segment at the opposite end of the mud guard will also be rotated and the arrow arranged above the guard disposed in a position corresponding to the position of the arrow which is operated through the medium of the wire 17. The arrows may thus be disposed to point inwardly or outwardly by shifting the handle member 25 in one direction or the other. When this handle member is grasped, the operator closes the switch 30, if it is necessary to illuminate the hollow arrows 8. The rear arrow 8 preferably bears the sign plate, indicated at 31, having the word "Slow" on each side thereof.

The operating handle 25 being positioned upon the side of the vehicle body, adjacent to the operator's side, may be instantly actuated, and by locating the operating handle at this point, the same will not constitute an obstruction in entering or descending from the vehicle. The device, as a whole, is exceedingly simple in its construction, may be produced at small manufacturing cost, and can be readily applied to the ordinary motor vehicle. In view of the relatively few parts employed and the simplicity of their construction, it will further be appreciated that the device is not liable to get out of order. By the provision of the movable direction indicating arrows, pedestrians or other motorists may be notified of the intentions of the operator with regard to the subsequent movements of the vehicle and collisions thus avoided.

While I have shown and described the preferred construction and arrangement of the several parts of the device, it is to be understood that the same is susceptible of considerable modification therein and I, therefore, reserve the privilege of resorting to all such legitimate changes as may be fairly embodied within the spirit and scope of the invention as claimed.

Having thus fully described my invention, what I desire to claim and secure by Letters Patent is:—

A direction indicator for vehicles including front and rear indicating members each having a vertically disposed, rotatably mounted spindle, a pinion on the lower end of the spindle, a housing for said pinion, a segmental gear meshing with the pinion, a substantially semi-circular, pivotally mounted operating member, a handle centrally fixed thereto, flexible elements positively connected to said operating member on relatively opposite sides of its pivot, said elements being connected at their other ends to the respective segmental gears on one side of the axis thereof, and a single flexible element connecting the gears to each other at the opposite side of their axes.

In testimony whereof I hereunto affix my signature in the presence of two witnesses.

MILO MONROE McKINNEY.

Witnesses:
 W. W. McKINNEY,
 A. R. KIMBERMAN.